United States Patent [19]

Malley

[11] Patent Number: 5,742,282
[45] Date of Patent: Apr. 21, 1998

[54] 16 BIT ADDRESS ACCESS USING 8 BIT REGISTERS

[75] Inventor: Michael Timothy Malley, LeRoy, N.Y.

[73] Assignee: Eastman Kodak Company, Rochester, N.Y.

[21] Appl. No.: 395,958

[22] Filed: Feb. 28, 1995

[51] Int. Cl.$^6$ ............................................. G09G 5/22
[52] U.S. Cl. ................................................ 345/193; 345/50
[58] Field of Search ............................. 345/185, 192, 345/193, 194, 200, 50, 51; 396/201, 292, 284; 348/333

[56] References Cited

U.S. PATENT DOCUMENTS

| | | |
|---|---|---|
| 3,757,306 | 9/1973 | Boone . |
| 4,449,184 | 5/1984 | Pohlman, III et al. ................. 364/200 |
| 4,713,749 | 12/1987 | Magar et al. . |
| 4,751,546 | 6/1988 | Yamamoto et al. ....................... 345/50 |
| 4,831,514 | 5/1989 | Turlakov et al. ........................ 364/200 |
| 4,845,611 | 7/1989 | Turlakov et al. ........................ 364/200 |
| 4,888,610 | 12/1989 | Tsujimoto et al. ....................... 396/292 |
| 5,113,297 | 5/1992 | Dewa ..................................... 395/275 |

OTHER PUBLICATIONS

"HD44780U Dot-Matrix Liquid Crystal Display Controller/Driver", Dec. 1992, Hitachi, Ltd. pp. 1–59.

*Primary Examiner*—Chanh Nguyen
*Attorney, Agent, or Firm*—Heslin & Rothenberg, P.C.

[57] ABSTRACT

The 16 bit program counter of an 8 bit microprocessor within a camera is used to provide a 16 character display on the camera, such that messages with a 16 bit address are accessed. When the message for display is invoked, the address of the message is placed in the program counter, and a software interrupt is caused. Due to the software interrupt, the upper and lower bytes of the address in the program counter are pushed onto the stack, popped off the stack and stored in adjacent memory locations. The address may then be read from the adjacent memory locations, the message displayed and a return from interrupt effected.

5 Claims, 3 Drawing Sheets

16 BIT ADDRESS ACCESS USING 8 BIT REGISTERS

BACKGROUND OF THE INVENTION

TECHNICAL FIELD

The present invention generally relates to addressing in 8 bit registers. More particularly, the present invention relates to accessing 16 bit addresses using 8 bit registers.

BACKGROUND INFORMATION

In the past, 8 bit microprocessors have primarily been used for device control, such as the control of a camera, and have some inherent short-comings with respect to addressing. For example, some 8 bit microprocessors utilize 16 bit addresses to define instruction locations, RAM and I/O. Pointing to a specific address having an offset greater than 255 with one of these microprocessors is not possible, since such an address is longer than 8 bits. For many applications, there is no need to store a table of values greater than 255 bytes, such that the addressing limitation poses no problem. However, the ability to access 16 bit addresses in an 8 bit microprocessor provides the possibility of new applications.

The camera industry today is primarily based on the use of 8 bit microprocessors. The main reason for the continued use of 8 bit microprocessors, when more technologically sophisticated microprocessors are available, is cost. The camera industry is cost-driven, with the addition of costlier elements resulting in higher prices and potentially smaller profits. Thus, the industry has focused on utilizing 8 bit microprocessors to the limit of their potential. In that context, the conservation of memory space and coding minimization techniques have emerged. While software engineers in general have moved to modular coding techniques, allowing one module to call another without having to know the specific memory location of that module, software engineers in the camera industry have experienced frustration with the inability to access 16 bit addresses without specifically identifying the address in the microcode (i.e., in-line coding), reducing coding efficiency.

Thus, a need exists for a way to access 16 bit addresses with 8 bit microprocessors without using in-line coding.

SUMMARY OF THE INVENTION

Briefly, the present invention satisfies the need for a way to access 16 bit addresses in 8 bit microprocessors without using in-line coding by utilizing the 16 bit program counter within an 8 bit microprocessor along with a software interrupt, such that the 16 bit address is placed in two known 8 bit memory locations.

In accordance with the above, it is an object of the present invention to provide enhanced addressing capabilities in an 8 bit microprocessor.

It is another object of the present invention to provide access to a 16 bit address in an 8 bit microprocessor.

It is a further object of the present invention to provide indirect accessing of 16 bit addresses in an 8 bit microprocessor to reduce reliance on in-line coding.

The present invention provides, in a first aspect, a method for indirectly accessing a 16 bit address in a microprocessor including a 16 bit program counter, a stack including a plurality of 8 bit registers and a memory including a plurality of 8 bit registers. The method begins by invoking a program portion and placing an address therefor in the 16 bit program counter, the address including a first byte and a second byte. After invocation of the program portion, the method causes a software interrupt. Due to the software interrupt, the first and second bytes are pushed from the 16 bit program counter onto the stack. The first and second bytes are then popped from the stack and stored in a first location and second location in the memory, respectively. After storing the first and second bytes, the method returns from the software interrupt. The method may further comprise reading the first location and second location in memory, and executing the program portion. The steps of reading and executing may be performed prior to the step of returning. The microprocessor may be part of a camera, including a display, where the program portion comprises a message for display, and the method further comprises a step of displaying the message on the display. The program portion may begin with a software interrupt instruction, the step of causing comprising executing the software interrupt instruction.

The present invention provides, in a second aspect, a microprocessor comprising a 16 bit program counter, a stack including a plurality of 8 bit registers, a memory including a plurality of 8 bit registers for storing a plurality of program portions, and means for indirectly accessing a 16 bit address of one of the plurality of program portions. The indirect accessing means may comprise a means for invoking the one of the plurality of program portions and placing the 16 bit address in the 16 bit program counter, the 16 bit address including a first byte and a second byte. Where the indirect accessing means comprises the means for invoking, the indirect accessing means further comprises a means for causing a software interrupt, a means for pushing the first byte and second byte from the 16 bit program counter onto the stack, a means for popping the first byte and second byte off the stack, a means for storing the first byte in a first location in memory and storing the second byte in a second location in memory, and a means for returning from the software interrupt. Where the microprocessor includes the indirect accessing means, the microprocessor may further comprise a means for reading the first and second memory locations, and a means for executing the program portion. The first location may comprise a first predetermined location and the second location may also comprise a second predetermined location. The first and second locations may be adjacent one another.

The present invention provides, in a third aspect, a camera comprising a display for displaying a message to a user, and a microprocessor for controlling the display. The microprocessor comprises a 16 bit program counter, a stack including a plurality of 8 bit registers, a memory for storing a plurality of messages, a memory including a plurality of 8 bit registers, and a means for indirectly accessing a 16 bit address of the message. The indirect accessing means may comprise a means for invoking the message and placing the 16 bit address in the 16 bit program counter, the 16 bit address including a first byte and a second byte, means for causing a software interrupt, means for pushing the first byte and second byte from the 16 bit program counter onto the stack, means for popping the first and second bytes off the stack, means for storing the first byte in a first location in memory and the second byte in a second location in memory, and means for returning from the software interrupt. The camera may further comprise, within the microprocessor, a means for reading the first and second locations, and a means for effecting display of the message on the display. The display effecting means may comprise a display driver controlled by the microprocessor. Where the message begins with a software interrupt instruction, the causing means may comprise means for executing the software interrupt instruction. The display may comprise a 16 character display. In addition, the display may comprise a liquid crystal display.

These, and other objects, features and advantages of this invention will become apparent from the following detailed description of the various aspects of the invention taken in conjunction with the accompanying drawings.

BEST MODE FOR CARRYING OUT THE INVENTION

The camera industry today is largely based on the use of 8 bit microprocessors (as opposed to, for example, 16 bit microprocessors), due mainly to cost factors. However, as cameras have become more technologically sophisticated with the addition of new electronic features, the demands placed on 8 bit microprocessors are pushing the boundaries of their capabilities. To conserve memory space in the 8 bit microprocessors, software engineers have moved to modular coding techniques which allow a given module to call another, without having to know where the other module is placed in memory. However, since the memory location addresses are 16 bits long in an 8 bit microprocessor, while the individual memory cells are only 8 bits long, the ability to modularized without reference to the address of modules (i.e., without in-line coding) is limited in 8 bit microprocessors. The present invention provides indirect 16 bit addressing in an 8 bit microprocessor.

Figure 1:
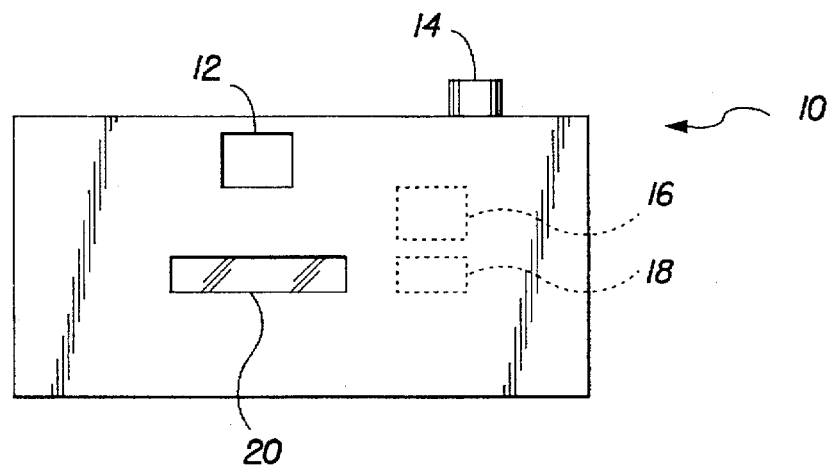
FIG. 1 depicts a back view of a camera according to the present invention.

FIG. 1 depicts a side view of a camera 10 according to the present invention. Camera 10 includes view finder 12, shutter-release button 14, microprocessor 16, display driver 18 and 16 character display 20. The general operation of camera 10 for taking photographs will be understood by one of ordinary skill in the art. Display 20 may be, for example, a liquid crystal display (LCD) for displaying messages to a user. Exemplary messages include such things as "subject too close" and "out of film". Microprocessor 16 stores the messages for display on display 20 in internal memory, and ultimately controls the display through control of display driver 18. Display driver 18 may be, for example, a conventional LCD text driver.

Figure 2:
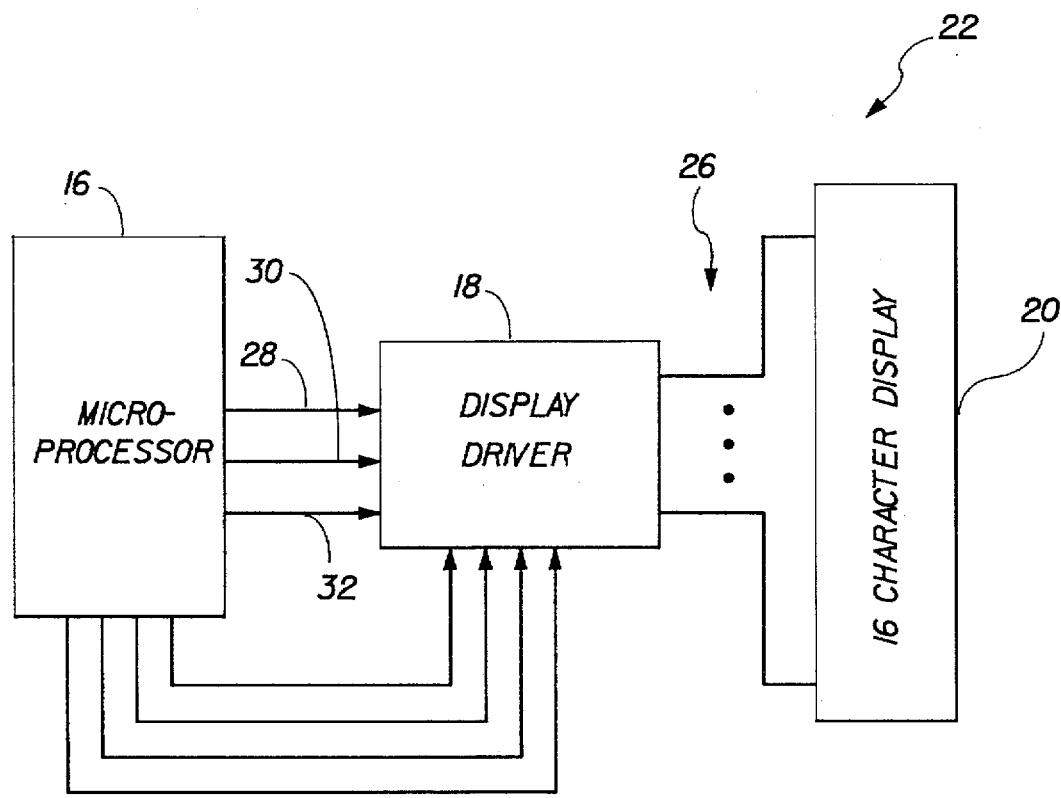
FIG. 2 is a block diagram of a microprocessor, display driver and display from the camera of FIG. 1.

FIG. 2 depicts display apparatus 22 for displaying a message. Display apparatus 22 comprises microprocessor 16, display driver 18 and display 20 of FIG. 1. Microprocessor 16 and display driver 18 are connected via data lines 24, and display driver 18 and display 20 are connected via display lines 26. Between microprocessor 16 and display driver 18 are also a data/instruction indicator line 28, a read/write line 30 and a clock line 32.

The general operation of display apparatus 22 will now be described. Lines 28, 30 and 32 between microprocessor 16 and display driver 18 are hand shaking lines allowing microprocessor 16 to send data or instructions over data lines 24 to display driver 18. It will be understood that although only four data lines 24 are shown, there could be more or less data lines. It will further be understood that display apparatus 22, as described herein, is exemplary. Since data lines 24 comprise four lines, if a character to be displayed comprises more than four bits, multiple data transfers would need to take place between microprocessor 16 and display driver 18 to effect display of that character. Display 20 may be, for example, a 5×8 dot matrix liquid crystal display. One example of a commercially available display driver useful with the present invention is a model HD44780U from Hitachi, Ltd., the manual for which, entitled "HD44780U Dot-Matrix Liquid Crystal Display Controller/Driver", 1992, is herein incorporated by reference in its entirety. Data/instruction indicator line 28 carries a signal from microprocessor 16 to display driver 18 indicating whether the information to come over data lines 24 is data or an instruction, depending on whether the signal is low or high. For example, a low signal may indicate an instruction, and a high signal may indicate data. Read/write line 30 carries a signal from microprocessor 16 to display driver 18 indicating whether the microprocessor will be writing to the display driver or whether it will be reading from the display driver. For example, a low signal may indicate a read, and a high signal may indicate a write. Clock line 32 carries a clock signal from microprocessor 16 to display driver 18. Display lines 26 carry signals from display driver 18 to display 20 for illuminating the segments within each of the display positions to form visual characters.

Figure 3:
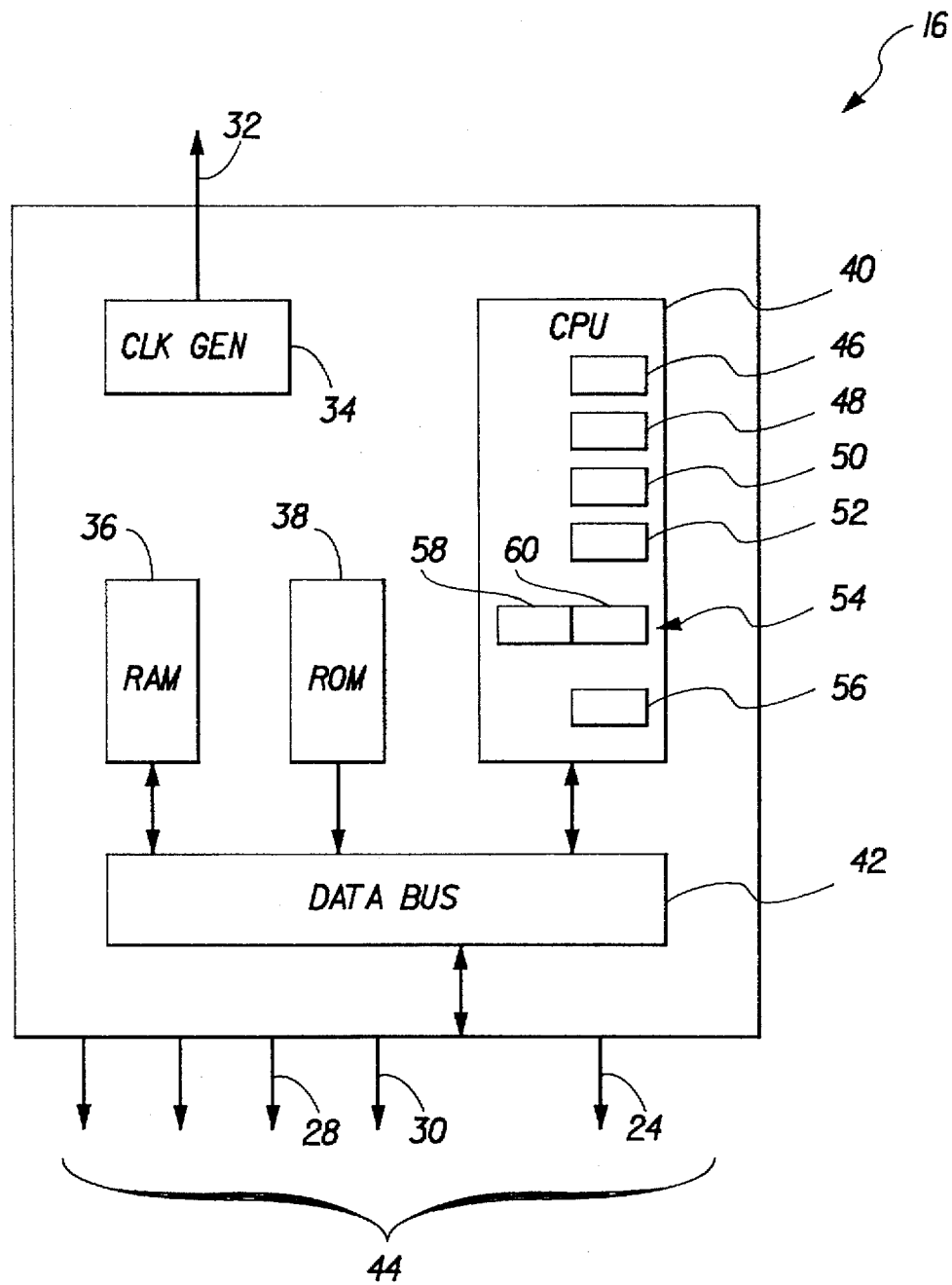
FIG. 3 is a more detailed block diagram of the microprocessor of FIG. 2.

FIG. 3 depicts a more detailed block diagram of microprocessor 16. The structure of microprocessor 16 is that of a conventional general purpose 8 bit microprocessor. It will be understood, however, that other types of 8 bit microprocessors could be used with the present invention. Microprocessor 16 comprises clock generation circuit 34, random access memory (RAM) 36, read only memory (ROM) 38, central processing unit (CPU) 40, data bus 42 and I/O ports 44. Clock generation circuit 34 provides the clock signal to display driver 18 over line 32. RAM 36 comprises a plurality of 8 bit registers, and holds the 16 bit address of the message for display (see discussion of the flow diagram of FIG. 4). ROM 38 also comprises a plurality of 8 bit registers, and holds the instructions for the operation of camera 10, as well as an interrupt handling routine for handling the software interrupt described with respect to the flow diagram of FIG. 4, and also holds the message for display. Data bus 42 allows for the exchange of data between RAM 36, ROM 38, CPU 40 and I/O ports 44. CPU 40 comprises accumulator 46, index register 48, index register 50, stack pointer 52, program counter 54 and status register 56. Each of accumulator 46, index registers 48 and 50, stack pointer 52 and status register 56 comprise an 8 bit register. Program counter 54 comprises two 8 bit registers 58 and 60. Accumulator 46 is generally used for arithmetic operations, data transfer, temporary saving and condition decisions. Index registers 48 and 50 are used in addressing, where the actual address is the sum of the contents of the specified address and the contents of the specified index register. Index registers 48 and 50 may also serve other functions. Stack pointer 52 is used for subroutine calls and interrupts. When a program branches out from its presently executing routine to a subroutine or a interrupt routine, the return address is stored in stack pointer 52. The "stack" is normally located in RAM 36. Program counter 54 is a 16 bit counter specifying the address of an instruction that is to be executed next. Status register 56 consists of flags that maintain the status immediately after computation. The status register may contain such flags as a carry flag, a zero flag, an interrupt flag, an overflow flag, negative flag, a break flag, as well as other status flags. One skilled in the art will understand the operation of microprocessor 16.

Figure 4:
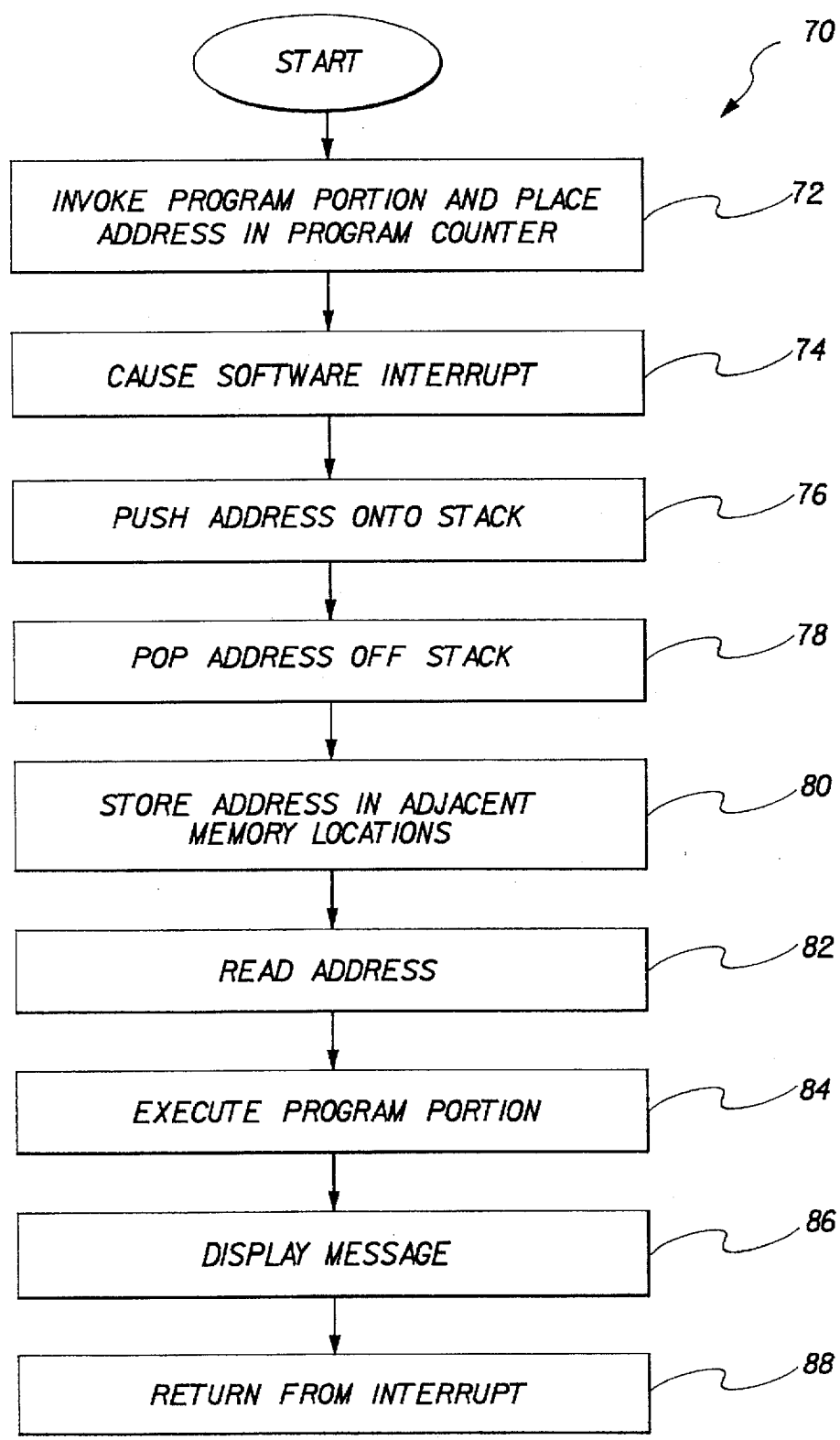
FIG. 4 is a flow diagram of a method for indirectly accessing a 16 bit address in an 8 bit microprocessor, according to the present invention.

FIG. 4 is a flow diagram 70, of a method for indirectly accessing a 16 bit address in an 8 bit microprocessor according to the present invention. The method will be described with reference to microprocessor 16 shown in FIG. 3. The method begins when a program portion stored in ROM 38 is invoked, for example, by another program portion via a "jump" statement or other call, which causes the 16 bit address of the program portion to be placed in program counter 54 (step 72, "INVOKE PROGRAM PORTION AND PLACE ADDRESS IN PROGRAM COUNTER"). For example, a focusing routine in the microprocessor that controls the automatic focusing of the camera may determine that the subject to be photographed is too close to the camera, and invoke the "too close" message via reference to a label. At the ROM address of the program portion invoked, is a string of numbers, each representing a word in the message to be displayed, which can be found in a data dictionary, also stored in ROM 38. One skilled in the art will understand that a data dictionary is merely a listing of all the possible words for the messages in a particular portion of memory. However, prior to the numbers representing the words to be displayed is a software interrupt instruction, which causes the microprocessor to invoke an interrupt handling routine stored in ROM 38 (step 74, "CAUSE SOFTWARE INTERRUPT"). The software interrupt instruction is placed in data space, which is not conventionally done, nor usually advisable.

The execution of the software interrupt causes the microprocessor to push the current contents of program counter 54 onto the stack (step 76, "PUSH ADDRESS ONTO STACK"), which one skilled in the art will recognize as a temporary storage area consisting of a small group of registers in a computer memory. The stack is merely an area in RAM 36 pointed to by the contents of stack pointer 52. The address pushed onto the stack is the address of the numbers after the software interrupt instruction, representing the words in the message to be displayed, which are found in the data dictionary. The interrupt handler, in general, retrieves the address of the message and places it in a known memory location in RAM 36 from which the address can be used by a message creation program stored in ROM 38.

More specifically, the interrupt handler first causes the byte last pushed onto the stack to be popped off and placed in a known RAM location, and then causes the second byte to also be popped off the stack and placed in a second, preferably adjacent, RAM location (step 78, "POP ADDRESS OFF STACK" and step 80, "STORE ADDRESS IN ADJACENT MEMORY LOCATIONS"). The first byte popped off the stack will be the lower 8 bit address of the address of the message information, and the second byte popped off the stack will be the upper 8 bits of the address of the message information. The full 16 bit address of the message to be displayed is now contained in two adjacent locations in RAM 36 which can be read by the interrupt handler (step 82, "READ ADDRESS"). After reading the address, the interrupt handler is in a position to execute the program portion invoked (step 84, "EXECUTE PROGRAM PORTION"). After executing the program portion, the message is displayed on a 16 character display by the display driver (step 86, "DISPLAY MESSAGE"). After causing display of the message, the interrupt handler returns from the software interrupt (step 88, "RETURN FROM INTERRUPT").

Alternatively, the execution of the program portion and the display of the message could be handled by the entity that invoked the program portion, rather than having the interrupt handler do so. However, the interrupt handler preferably handles the execution of the program portion and display of the message, since this provides a code savings, in that the entity invoking the program portion need not handle the message creation with in-line coding.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

I claim:

1. A camera, comprising:
   a display for displaying a message to a user, wherein said message is preceded at a 16 bit address with a software interrupt instruction; and
   a microprocessor for controlling said display, wherein said microprocessor comprises a 16 bit program counter, a stack including a plurality of 8 bit registers, and a memory for storing a plurality of messages, said memory including a plurality of 8 bit registers, and wherein said microprocessor is programmed to:
   invoke said message and place said 16 bit address in said 16 bit program counter, said 16 bit address including a first byte and a second byte,
   cause a software interrupt by executing said software interrupt instruction,
   push said first byte and said second byte from said 16 bit program counter onto said stack,
   pop said first byte and said second byte off said stack,
   store said first byte in a first location in said memory and store said second byte in a second location in said memory, and return from said software interrupt.

2. The camera of claim 1, wherein said microprocessor is further programmed to:
   retrieve said first byte from said first location and said second byte from said second location; and
   effect display of said message on said display.

3. The camera of claim 1, wherein said microprocessor comprises a display driver controlled by said microprocessor to effect display of said message on said display.

4. The camera of claim 1, wherein said display comprises a 16 character display.

5. The camera of claim 1, wherein said display comprises a liquid crystal display.

* * * * *